(12) United States Patent
Shin

(10) Patent No.: US 9,615,419 B2
(45) Date of Patent: Apr. 4, 2017

(54) AC LED DRIVING CIRCUIT

(71) Applicant: Merlot Laboratories Inc., Seoul (KR)

(72) Inventor: So-Bong Shin, Seoul (KR)

(73) Assignee: MERLOT LABORATORIES INC., Seoul (KR)

( * ) Notice: Subject to any disclaimer, the term of this patent is extended or adjusted under 35 U.S.C. 154(b) by 0 days.

(21) Appl. No.: 14/592,360

(22) Filed: Jan. 8, 2015

(65) Prior Publication Data

US 2015/0230308 A1    Aug. 13, 2015

(30) Foreign Application Priority Data

Feb. 13, 2014    (KR) .......................... 10-2014-0016508

(51) Int. Cl.
*H05B 37/02*    (2006.01)
*H05B 33/08*    (2006.01)

(52) U.S. Cl.
CPC ..... *H05B 33/0845* (2013.01); *H05B 33/0812* (2013.01)

(58) Field of Classification Search
CPC ............ H05B 33/0815; H05B 33/0803; H05B 33/083; H05B 33/0809; H05B 41/2828; H05B 41/46; H05B 37/02; Y02B 20/346
USPC ............. 315/291, 294, 185 R, 122, 224, 312
See application file for complete search history.

(56) References Cited

U.S. PATENT DOCUMENTS

| | | | |
|---|---|---|---|
| 8,228,001 B2* | 7/2012 | Fan ..................... | H05B 33/0815 315/169.1 |
| 9,018,856 B2* | 4/2015 | Jeong .................. | H05B 33/083 315/122 |
| 2014/0210352 A1* | 7/2014 | Grajcar .............. | H05B 33/0809 315/122 |

FOREIGN PATENT DOCUMENTS

| KR | 20090048100 A | 5/2009 |
|---|---|---|
| KR | 20130120421 A | 11/2013 |

\* cited by examiner

*Primary Examiner* — Haissa Philogene
(74) *Attorney, Agent, or Firm* — Lucas & Mercanti, LLP

(57) ABSTRACT

Disclosed herein is an AC LED driving circuit. The AC LED driving circuit includes a power supply unit. An LED driving unit includes an LED lighting unit having a first LED unit to an n-th LED unit, and a plurality of switching circuit units. A dimmer driving unit includes a VCCS, an input terminal and an output terminal of which are respectively connected to a connection line between the output terminal of the rectification circuit and the first LED unit and to an output terminal of the switching circuit units, a reference voltage supply unit, and a common resistor, a first end of which is connected to a negative terminal of the reference voltage supply unit, and a second end of which is connected in common to an output line of the VCCS and to an output terminal of the switching circuit units.

13 Claims, 12 Drawing Sheets

PRIOR ART

AC LED DRIVING CIRCUIT

CROSS-REFERENCE TO RELATED APPLICATIONS

This application claims the benefit of Korean Patent Application No. 10-2014-0016508, filed Feb. 13, 2014, the content of which is incorporated herein by reference.

FIELD OF THE INVENTION

The present invention relates generally to an Alternating Current (AC) Light Emitting Diode (LED) driving circuit and, more particularly, to an AC LED driving circuit that is configured such that, when a current value supplied to an LED driving circuit connected in parallel with a dimmer driving circuit based on a power supply circuit is sufficient to drive LEDs and a dimmer, the dimmer is driven using the corresponding supplied current value, and when the current value supplied to the LED driving circuit is not sufficient to drive the dimmer, such deficiency in the current value is compensated for with the hold current value of the dimmer driving circuit, thus enabling the dimmer to be always normally operated.

BACKGROUND OF THE INVENTION

An AC LED driving circuit proposed as a scheme for driving LEDs under an AC power condition has advantages, such as a simplified manufacturing process, a low defect rate, and a long lifespan, compared to a Switched Mode Power Supply (SMPS) scheme.

Referring to FIG. 1, FIG. 1 is a diagram showing a conventional, typical AC LED driving circuit. The fundamental principle of such an AC LED driving circuit is to sequentially control current sources.

Further, in order to stably drive a phase-cut dimmer using the AC LED driving circuit of FIG. 1, a current source for causing a hold current required to drive the dimmer to flow must be added to a location between a bridge circuit and a first LED.

FIG. 2 illustrates the conventional AC LED driving circuit. As shown in the drawing, the AC LED driving circuit includes an AC power source 10, a full-half rectifier 20, a plurality of LEDs 31 to 34, a number of current sources 41 to 44 corresponding to the number of LEDs 31 to 34, and an algorithm circuit for controlling the entire circuit, and further includes a dimmer 50 and a bleeding current source 60 for stably operating the dimmer 50.

Further, in the AC LED driving circuit, an I_HOLD current source, that is, the bleeding current source 60, functions to supply a drive current required for the driving of the dimmer to an overall area supplied with power by driving the current required for the driving of the dimmer at the time point when the current sources ILED1~ILEDn are not driven. Therefore, I_HOLD is set to have a current value required to drive the dimmer, independent of the current sources ILED1~ILEDn. At the moment at which AC power is increased and then ILED1~ILEDn are driven, I_HOLD stops its operation. When the AC power is decreased and then the circuit enters an area in which ILED1 is not driven, I_HOLD needs to be driven again.

In other words, the AC LED driving circuit of FIG. 2 needs to perform control such that I_HOLD is turned off at the moment at which ILED1 is driven and I_Hold is driven again at the moment at which ILED1 stops its operation so that I_HOLD and ILED1 are not simultaneously driven. Accordingly, the AC LED driving circuit additionally requires a control circuit for checking the driving time point of ILED1 and turning off I_HOLD. Further, under the condition of ILED1<I_HOLD, input current at the time point at which a first LED group is operated does not reach the current required to drive the dimmer. In this case, a method of supplementing an amount of current necessary for the driving of the dimmer is additionally required.

Referring to FIG. 3A and FIG. 3B, FIG. 3A and FIG. 3B are diagrams showing the current waveforms of the AC LED driving circuit of FIG. 2. As shown in the drawing, FIG. 3A shows that, when ILED1>I_HOLD and both of the two currents are set to current values greater than a minimum current value required to operate the dimmer, I_in represented by the sum of the two currents is also greater than a minimum current value required to drive the dimmer. Thus there is no problem with the driving of the dimmer. However, as shown in FIG. 3B, when the condition of ILED1<I_HOLD is formed while the value of ILED1 becomes less than a minimum current value required to drive the dimmer, I_in is also less than the minimum current value required to drive the dimmer in an area in which the ILED1 is driven. In this case, the dimmer cannot be normally operated.

For reference, in consideration of the recent development level of LEDs, it is expected that LEDs having optical efficiency of 200(lm/W) or more beyond the optical efficiency of LEDs that are currently popularized in markets, that is, 160(lm/W), will be commercialized in several years. This means that LED current is entirely decreased, but a current value required to drive the dimmer is typically maintained at 20 to 40 mA, and thus there is a strong possibility that a situation such as that shown in FIG. 3B will occur.

PRIOR ART DOCUMENTS

Patent Documents (Patent Document 1) Korean Patent Application Publication No. 10-2013-0120421 (Date of publication: Nov. 4, 2013) entitled "LED dimmer, LED lighting apparatus including LED dimmer, and dimming control method for LED lighting apparatus"

(Patent Document 2) Korean Patent Application Publication No. 10-2009-0048100 (Date of publication: May 13, 2009), entitled "Dimming power supply device for LED"

SUMMARY OF THE INVENTION

Accordingly, the present invention has been made keeping in mind the above problems occurring in the prior art, and an object of the present invention is to provide an AC LED driving circuit, in which an LED driving circuit and a dimmer driving circuit are connected in parallel with each other based on a power supply circuit, and which is configured to, when a current value supplied to the LED driving circuit is sufficient to drive LEDs and a dimmer, drive the dimmer using the corresponding supplied current value, and when the current value supplied to the LED driving circuit is not sufficient to drive the dimmer, compensate for such deficiency in the current value with the hold current value of the dimmer driving circuit, thus enabling the dimmer to be always normally operated Another object of the present invention is to provide an AC LED driving circuit, in which an LED driving circuit and a dimmer driving circuit are connected in parallel with each other based on a power supply circuit, and which can always secure the stable operation of a dimmer without requiring a separate control circuit for controlling the operating time point of a first LED included in the LED driving circuit and the operating time point of the hold current of the dimmer driving circuit.

In order to accomplish the above objects, the present invention provides an Alternating Current (AC) Light Emitting Diode (LED) driving circuit, including a power supply unit including a dimmer connected to an AC power source and supplied with an AC voltage from the AC power source and a rectification circuit configured to rectify an output voltage of the dimmer, an LED driving unit including an LED lighting unit having a first LED unit located at a shortest distance from an output terminal of the rectification circuit to an n-th LED unit located at a longest distance from the output terminal of the rectification circuit, and a plurality of switching circuit units, input terminals of which are respectively connected to output terminals of a single LED unit, or two or more LED units constituting the LED lighting unit to form current supply channels for corresponding LED units, a dimmer driving unit including a voltage-controlled current source, an input terminal and an output terminal of which are respectively connected to a connection line between the output terminal of the rectification circuit and the first LED unit and to an output terminal of the switching circuit units, a reference voltage supply unit configured to apply a positive (+) reference voltage to the voltage-controlled current source, and a common resistor, a first end of which is connected to a negative (−) terminal of the reference voltage supply unit, and a second end of which is connected in common to an output line of the voltage-controlled current source and to an output terminal of the switching circuit units, wherein an output voltage of the voltage-controlled current source connected in series with the common resistor is input as a negative (−) voltage to the voltage-controlled current source, and then the current supplied from the rectification circuit to the LED driving unit is included in a negative feedback path of the dimmer driving unit.

The voltage-controlled current source may be designed such that current corresponding to the voltage applied from the reference voltage supply unit is output.

A current supply path from the rectification circuit to the LED driving unit may be connected in parallel with a line on which the voltage-controlled current source and the common resistor are connected in series with each other.

When a reference voltage (Vref) from the reference voltage supply unit is less than a value obtained by multiplying a current (ILEDa) supplied to the LED lighting unit by resistance of the common resistor (Rs), current (I_HOLD) flowing through the voltage-controlled current source may be determined by the following equation:

$$I\_HOLD = \frac{gm(Vref - ILEDa \times Rs)}{1 + gmRs}$$

where gm denotes a constant indicative of a voltage-to-current ratio.

When a value obtained by multiplying a current (ILEDa) supplied to the LED lighting unit by resistance of the common resistor (Rs) is greater than a positive (+) input voltage of the voltage-controlled current source, the current (I_HOLD) flowing through the voltage-controlled current source may become 0 due to an off operation of the voltage-controlled current source, so that the dimmer is driven by the current of the LED driving unit, and when the current (ILEDa) supplied to the LED lighting unit is 0, a negative feedback circuit for driving the dimmer may be formed using only the positive (+) input voltage of the voltage-controlled current source and the common resistor, and thus the dimmer may be driven by the dimmer driving unit while a condition in which current (I_in) output from the rectification circuit is identical to the current (I_HOLD) flowing through the voltage-controlled current source is satisfied.

The voltage-controlled current source may include a Field Effect Transistor (FET), a drain of which is connected to the connection line between the output terminal of the rectification circuit and the first LED unit, a source of which is connected to the common resistor, and a gate of which is connected to the reference voltage supply unit.

The reference voltage supply unit of the dimmer driving unit may include a current source (internal supply, Iref) and a resistor (Rref) connected in series with each other, and is configured such that the gate of the FET that is the voltage-controlled current source is connected to a connection line between the current source (Iref) and the resistor (Rref) of the reference voltage supply unit, and the resistor (Rref) of the reference voltage supply unit is connected in parallel with a connection line between the common resistor and the rectification circuit.

The voltage-controlled current source may further include a comparator disposed on a connection line between the gate of the FET and the reference voltage supply unit and configured to receive a positive (+) voltage from the reference voltage supply unit and receive a negative (−) voltage from a connection node between the source of the FET and the common resistor.

The reference voltage supply unit of the dimmer driving unit may include a current source (internal supply, Iref) and a resistor (Rref) connected in series with each other, and is configured such that a voltage value of the current source (Iref) of the reference voltage supply unit is applied to a positive (+) input terminal of the comparator and the resistor (Rref) of the reference voltage supply unit is connected in parallel with a connection line between the common resistor and the rectification circuit.

The voltage-controlled current source may further include an FET, a drain of which is connected to a connection line between the output terminal of the rectification circuit and the first LED unit, a source of which is connected to the common resistor, and a gate of which is connected to the reference voltage supply unit, and a first comparator disposed on a connection line between the gate of the FET and the reference voltage supply unit, and configured to receive a positive (+) voltage from the reference voltage supply unit and receive a negative (−) voltage from a connection node between the source of the FET and the common resistor, and the LED driving unit may further include an LED common resistor connected in common to output lines of the respective switching circuit units, and a ground point grounded on a connection line between the LED common resistor and the output terminal of the voltage-controlled current source.

Each of the switching circuit units may include a switch voltage supply unit for supplying a reference voltage to a corresponding switching circuit unit, a second comparator for receiving the reference voltage of the switching voltage supply unit through a positive (+) input terminal thereof, and an FET, a drain of which is connected to an output terminal of a corresponding LED unit forming the LED lighting unit, a gate of which is connected to an output terminal of the second comparator, and a source of which is connected to the LED common resistor, wherein a negative (−) input terminal of the second comparator is connected to a connection line between the source of the FET and the LED common resistor, and a source output voltage of the FET is input as a negative (−) input voltage to the second comparator.

Each of the switching circuit units may include a switching voltage supply unit for applying a reference voltage to a corresponding switching circuit unit, a comparator for receiving the reference voltage of the switching voltage supply unit through a positive (+) input terminal thereof, an FET, a drain of which is connected to an output terminal of a corresponding LED unit forming the LED lighting unit, a gate of which is connected to an output terminal of the comparator, and a source of which is connected to a connection line between the output terminal of the voltage-controlled current source of the LED lighting unit and the common resistor, wherein a negative (−) input terminal of the comparator is connected to a connection line between the source of the FET and the common resistor, and a source output voltage of the FET is input as a negative (−) input voltage to the comparator.

The AC LED driving circuit may further include a power transistor disposed between a connection line between the output terminal of the rectification circuit and the first LED unit and the input terminal of the voltage-controlled current source.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, embodiments of an AC LED driving circuit according to the present invention will be described in detail with reference to the attached drawings.

Figure 4:
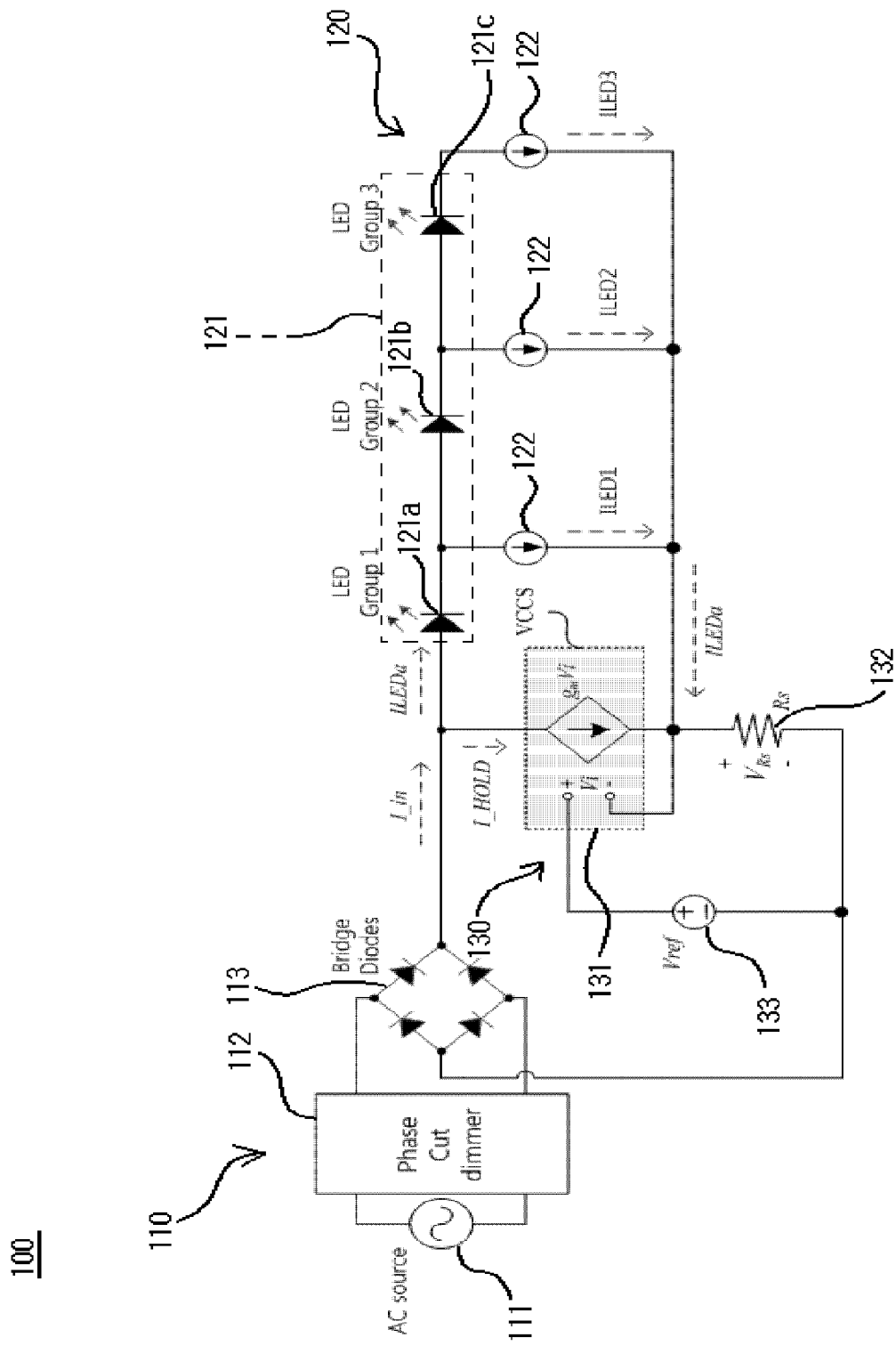
FIG. 4 is a diagram conceptually illustrating an AC LED driving circuit according to an embodiment of the present invention.

FIG. 4 is a diagram conceptually illustrating an AC LED driving circuit according to an embodiment of the present invention.

As shown in the drawing, an AC LED driving circuit 100 according to an embodiment of the present invention includes a power supply unit 110, an LED driving unit 120, and a dimmer driving unit 130.

The power supply unit 110 is configured to include a power input terminal (not designated by reference numeral) for receiving power from an external AC power source 111 (hereinafter referred to as "AC power"), a dimmer 112 for receiving an AC voltage from the AC power source 111, and a rectification circuit 113 for rectifying the output voltage of the dimmer 112. Here, as the dimmer 112, any one type of typical phase-cut dimmers may be selected and used, and thus a detailed description and illustration of the dimmer 112 will be omitted in the present embodiment. Further, the rectification circuit 113 may be implemented as a typical bridge circuit, and thus a detailed description and illustration of the rectification circuit 113 will be omitted in the present embodiment.

The LED driving unit 120 includes an LED lighting unit 121 and switching circuit units 122.

The LED lighting unit 121 is configured using a plurality of LED units, and includes a first LED unit 121a located at a shortest distance from the output terminal of the rectification circuit 113 of the power supply unit 110 to an n-th LED unit located at a longest distance from the output terminal of the rectification circuit 113. Further, the plurality of LED units included in the LED lighting unit 121 are sequentially connected in series in the sequence of the first LED unit to the n-th LED unit. In the present embodiment, although the LED lighting unit 121 has been exemplified as including the first LED unit 121a to third LED unit 121c as components thereof, the present invention is not limited to such an example. Further, each of the LED units 121a to 121c may be implemented as a single LED or may be implemented as a group of multiple LEDs.

The switching circuit units 122 are individually connected to the output terminals of a single LED or two or more LEDs constituting the LED lighting unit 121 and are configured to form current supply channels for the corresponding LEDs. A detailed configuration of the switching circuit units 122 will be described with reference to an embodiment shown in FIG. 6.

The dimmer driving unit 130 includes a Voltage-Controlled Current Source (VCCS) 131, a common resistor 132, and a reference voltage supply unit 133.

The VCCS 131 has an input terminal connected to a connection line between the output terminal of the rectification unit 113 of the power supply unit 110 and the first LED unit 121a of the LED lighting unit 121, and an output terminal connected to the common resistor 132. Here, the VCCS 131 is designed to output current as a gmVi value depending on a voltage Vi applied from the reference voltage supply unit 133.

The common resistor 132 Rs is connected in common to the output line of the VCCS 131 and to the connection line between the n-th LED unit of the LED lighting unit 121, that is, the third LED unit 121c in the present embodiment, and the rectification circuit 113.

The reference voltage supply unit 133 is connected in parallel with a connection line including the common resistor 132 Rs between the output terminal of the VCCS 131 and the rectification circuit 113, and applies a reference voltage to the VCCS 131.

That is, the reference voltage supply unit 133, the common resistor 132 Rs, and the VCCS 131 form the dimmer driving unit 130 in the form of a negative feedback circuit. In other words, the output voltage of the VCCS 131 connected in series with the common resistor 132 is input as a negative (−) voltage to the VCCS 131, so that the current supplied from the rectification circuit 113 to the LED driving unit 120 is included in the negative feedback path of the dimmer driving unit 130. Accordingly, as current ILEDa supplied to the LED driving unit 120 is included in the negative feedback path of the dimmer driving unit 130, the value of current I_HOLD flowing through the VCCS 131 is reflected in the value of ILEDa.

This operation will be described in greater detail below. A difference between the voltages at the positive (+) and negative (−) input terminals of the reference voltage supply unit 133, with respect to the VCCS 131, directly influences the output current value of the VCCS 131. In this case, when the output current of the VCCS 131 and the resistance of the common resistor 132 Rs connected in series with the VCCS 131 are applied to the negative (−) input terminal of the VCCS 131, a negative feedback path is formed between the input voltage and the output current of the VCCS 131. Further, when a path of current ILEDa supplied to the LED driving unit 120 is connected in parallel with the negative feedback path, current flowing into the path of ILEDa is applied to the common resistor 132 Rs, thus directly influencing the negative feedback circuit while directly influencing the input voltage of the VCCS 131. Further, this may be described as the following three cases:

First, when the current ILEDa supplied to the LED lighting unit 121 is very high and then the voltage applied to the common resistor 132 Rs is greater than the positive (+) input voltage Vref of the VCCS 131, the VCCS 131 is turned off and the output current I_HOLD of the VCCS 131 becomes 0. Thus, the current I_in output from the rectification circuit 113 of the power supply unit 110 becomes identical to the current ILEDa supplied to the LED lighting unit 121. Further, this status corresponds to a condition in which the dimmer 112 is driven due to the current supplied to the LED driving unit 120.

Second, when the current ILEDa supplied to the LED lighting unit 121 is 0, a negative feedback circuit for driving the dimmer 112 is formed by only the positive (+) input voltage Vref of the VCCS 131 and the resistance of the common resistor 132 Rs.

Accordingly, the output current I_HOLD of the VCCS 131 is also set depending on the positive (+) input voltage Vref of the VCCS 131 and the resistance of the common resistor 132 Rs. In this case, current I_in output from the rectification circuit 113 of the power supply unit 110 is identical to the output current I_HOLD of the VCCS 131, and this status corresponds to a condition in which the dimmer 112 is driven by the dimmer driving unit 130.

Third, when the ILEDa supplied to the LED lighting unit 121 is greater than 0, but a condition of ILEDa×Rs<Vref is satisfied, a negative feedback circuit for driving the dimmer 112 is driven while being organically influenced by ILEDa. That is, when ILEDa is increased, the value of (Vref−ILEDa×Rs) is decreased, and the output current I_HOLD of the VCCS 131 is decreased. In contrast, when the ILEDa is decreased, the value of (Vref−ILEDa×Rs) is increased, and the output current I_HOLD of the VCCS 131 is increased. In summary, complementary driving is realized in such a way that, when ILEDa is increased, I_HOLD is decreased, whereas when ILEDa is decreased, I_HOLD is increased. This status corresponds to a condition in which the dimmer 112 is driven by the sum of the current supplied to the LED lighting unit 121 and the current I_HOLD of the dimmer driving unit 130.

Further, the third case of the above three cases may be represented by the following Equation, which may be derived using the typical circuit theory from the circuit of FIG. 4.

When Vref>ILEDa×Rs, $$\text{I\_HOLD}=g_\mu V_i=g_\mu(Vref-V_{Po})=g_\mu(Vref(\text{I\_HOLD}+ \text{ILED}\alpha)Rs)$$

is obtained, where gm denotes a constant indicative of a voltage to current ratio. This equation is arranged as given in the following Equation (1):

$$\text{I\_HOLD} = \frac{gm(Vref - ILEDa \times Rs)}{1 + gmRs} \quad (1)$$

This shows that, when ILEDa is not sufficiently high enough to drive the dimmer 112, the current I_HOLD compensates for the deficiency of the ILEDa with the value of Equation 1. Further, when ILEDa becomes 0, the current I_HOLD is determined entirely using Vref and Rs.

In contrast, when Vref≤ILEDa×Rs, Vi≤0 is satisfied, and then I_HOLD=0. Thus, the dimmer 112 is driven entirely using the current ILEDa. That is, this indicates a case where the dimmer 112 may be sufficiently driven only by ILEDa.

Consequently, when the ILEDa is sufficient, the dimmer 112 is driven using the ILEDa. When the ILEDa is not sufficient to drive the dimmer 112, such deficiency may be compensated for with the current I_HOLD.

Figure 5B:
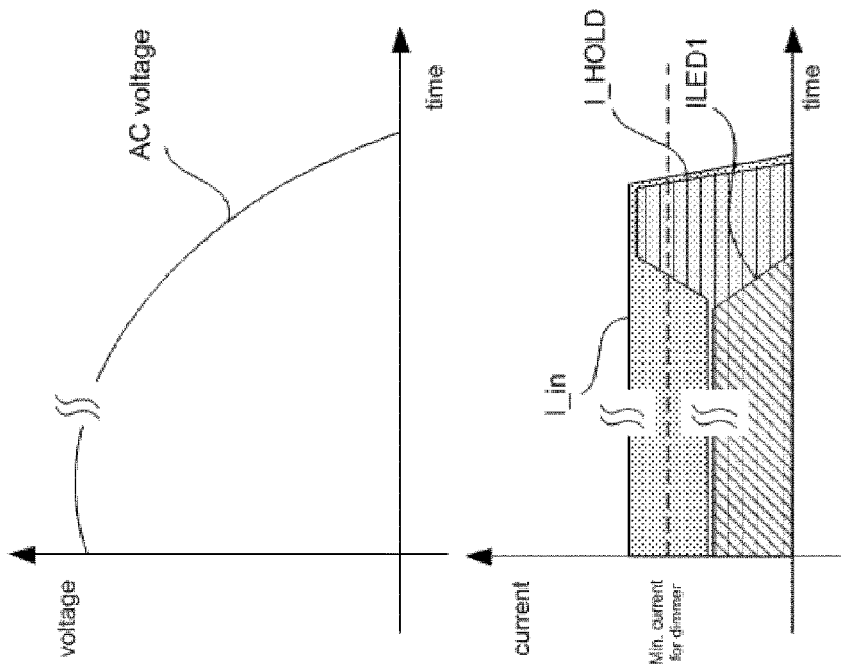
FIG. 5A and FIG. 5B are diagrams showing the current waveforms of the AC LED driving circuit of FIG. 4.
Figure 5A:
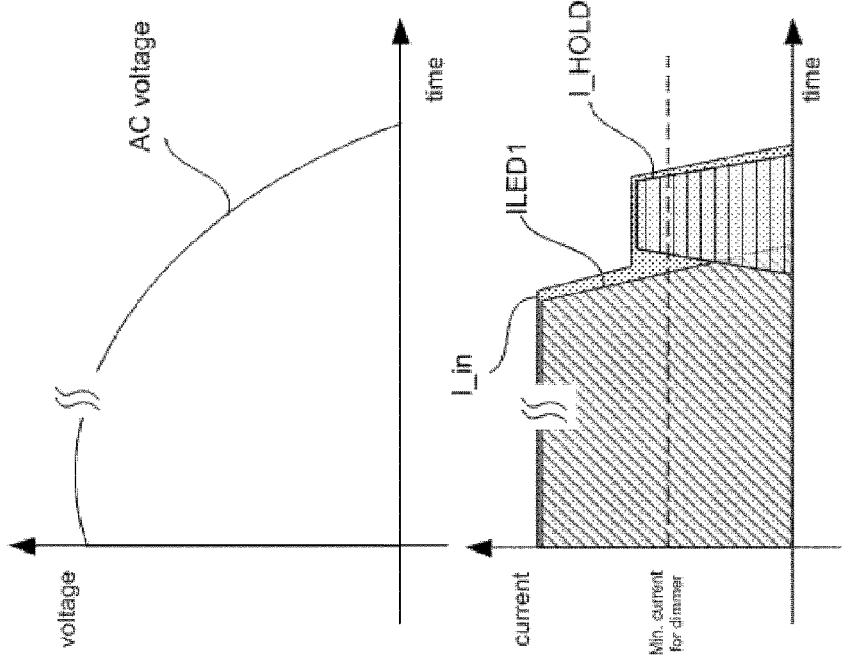

FIG. 5A and FIG. 5B are diagrams illustrating the current waveforms of the AC LED driving circuit of FIG. 4.

More specifically, FIGS. 5A and 5B illustrate the waveforms of currents I_HOLD, ILED, and I_in the AC LED driving circuit 100 in FIG. 4, and, in particular, FIG. 5B illustrates current waves on the assumption of gmRs>1.

Figure 1:
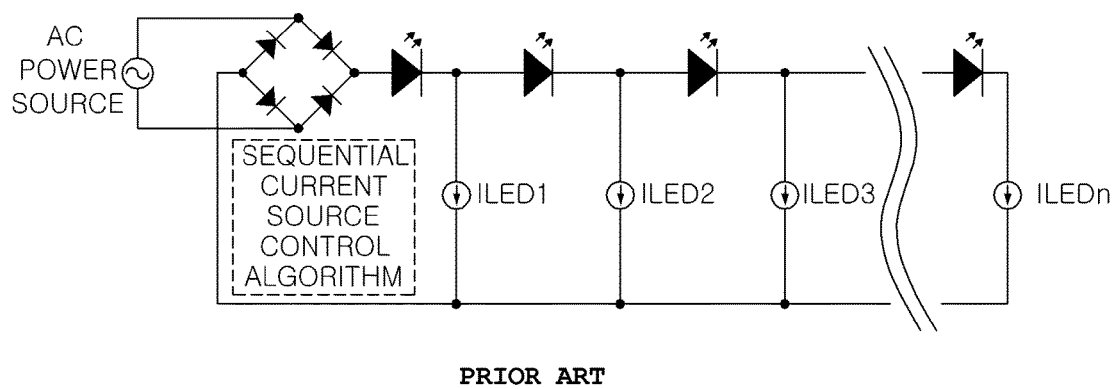
FIG. 1 is a diagram conceptually illustrating the structure of a conventional dimmer-free AC LED driving circuit.
Figure 2:
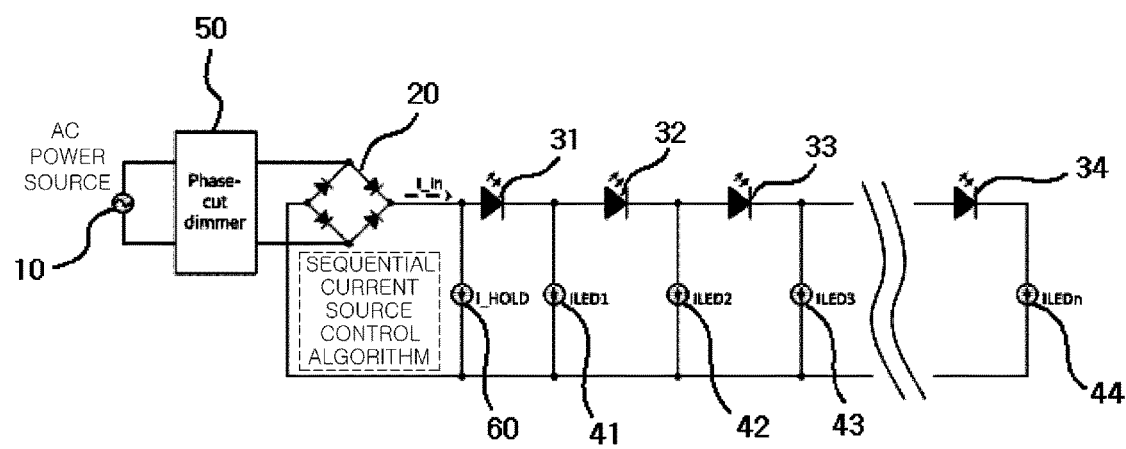
FIG. 2 is a diagram conceptually illustrating the structure of a conventional AC LED driving circuit having a dimmer.
Figure 3B:
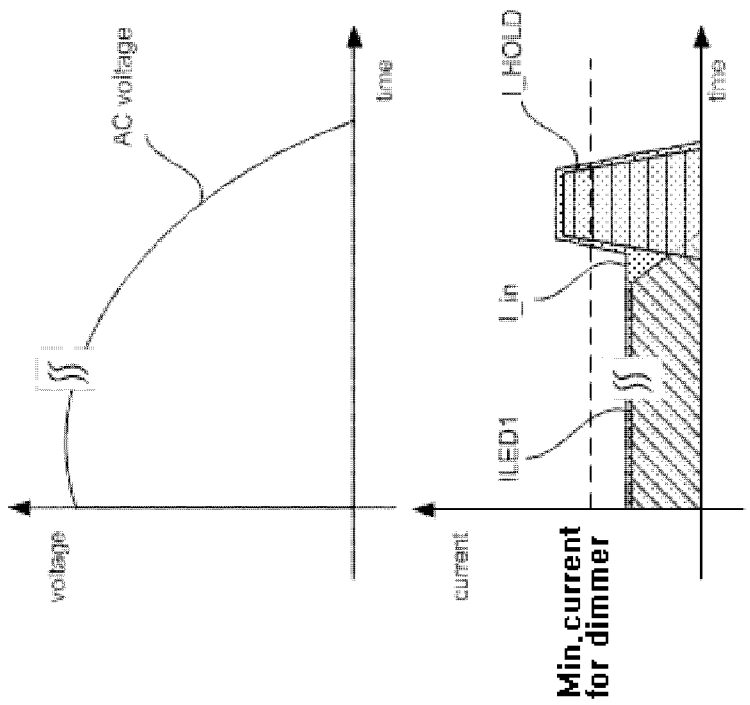
FIG. 3A and FIG. 3B are diagrams showing the current waveforms of the AC LED driving circuit of FIG. 2.
Figure 3A:
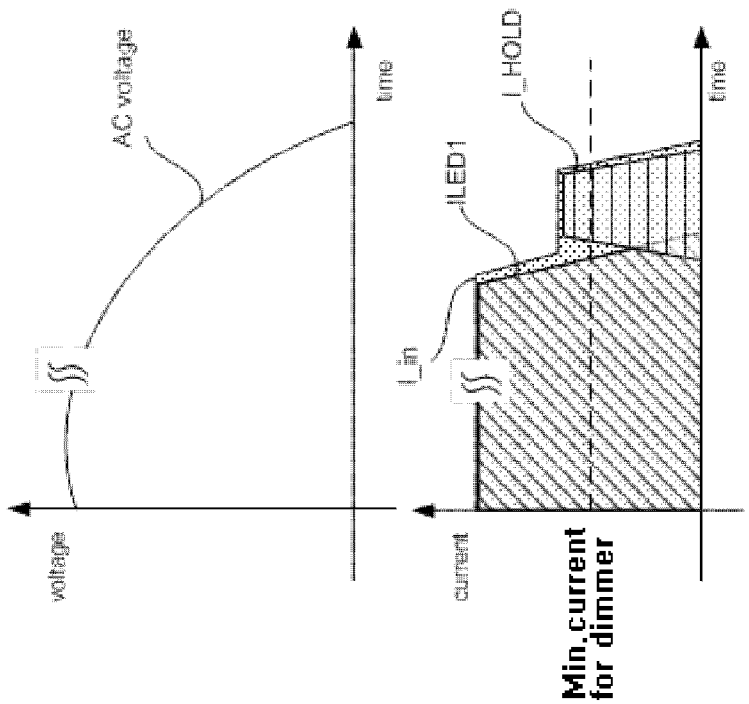

As shown in the drawings, FIG. 5A shows that, when ILED1>I_HOLD, the current waveform of I_in is identical to the existing current waveform shown in FIG. 3A. In contrast, FIG. 5B shows that, even if the value of ILED1 is less than the current value required to drive the dimmer 112, the AC LED driving circuit is operated in such a way that a difference between the maximum value of the I_HOLD and the ILED1 is compensated for with the current I_HOLD. Therefore, the value of current I_in is maintained at the maximum value of I_HOLD. Therefore, under any circumstances, the dimmer 112 is normally operated.

Below, specific examples of a VCCS that is a principle component of the AC LED driving circuit according to the embodiment of the present invention will be described with reference to FIGS. 6 to 10.

Prior to the description, it should be noted that, in the embodiments described with reference to FIGS. 6 to 10, the same reference numerals are used to designate the same components as those of the AC LED driving circuit 100 according to the embodiment of FIG. 4, and a detailed description thereof is omitted.

Figure 6:
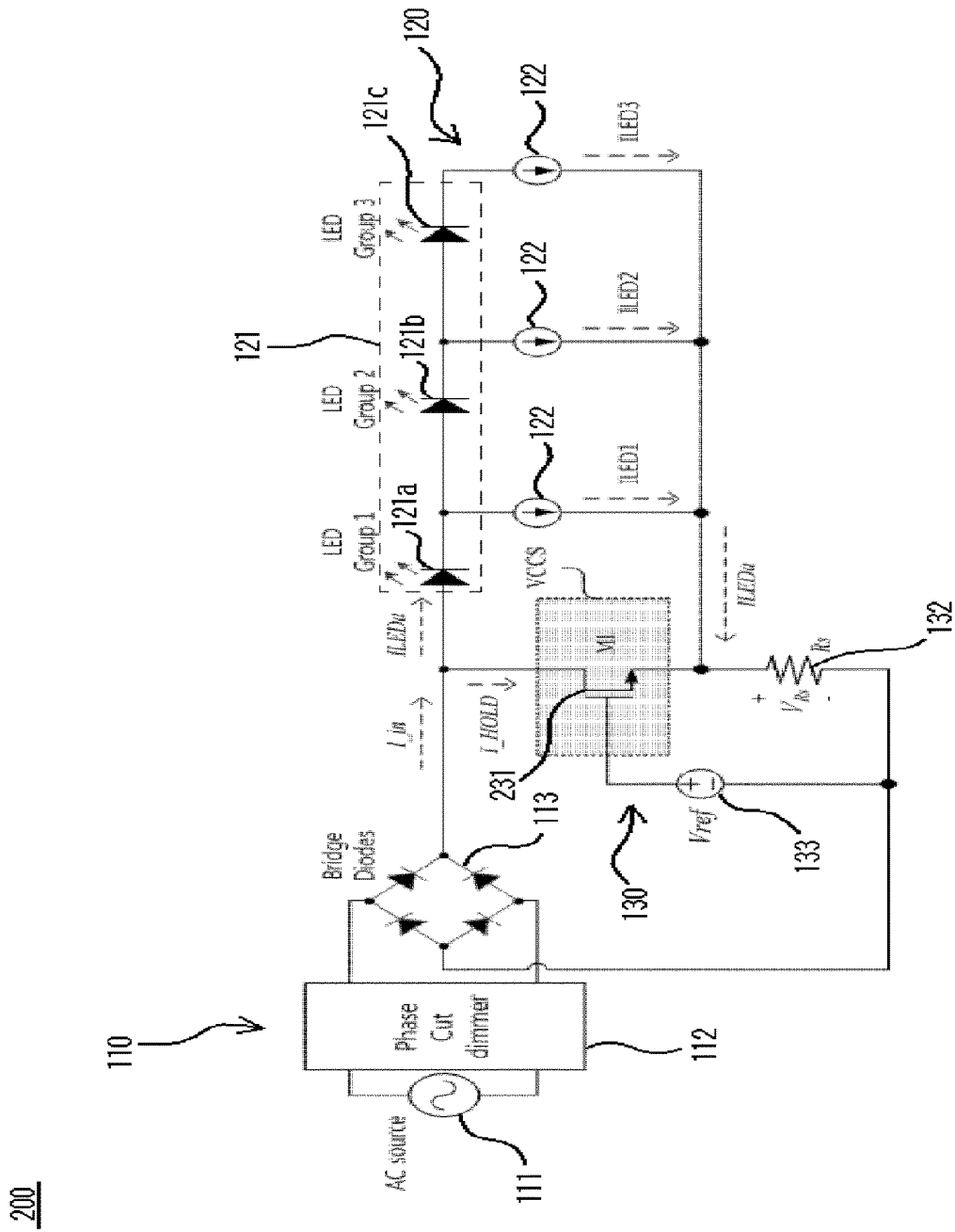
FIG. 6 is a diagram showing a specific example of a voltage-controlled current source in the AC LED driving circuit according to the embodiment of the present invention.

Referring to FIG. 6, FIG. 6 is a diagram showing a specific example of a VCCS, which is a principle component of the AC LED driving circuit according to the embodiment of the present invention.

As shown in the drawing, an example in which a VCCS 231 is implemented as a Field Effect Transistor (FET) is illustrated. More specifically, a structure in which the drain of the FET that is the VCCS 231 is connected to a connection line between the output terminal of a rectification circuit 113 and a first LED unit 121a, the source of the FET is connected to a common resistor 132, and the gate of the FET is connected to a reference voltage supply unit 133 is illustrated. That is, the FET basically corresponds to a very simple VCCS, and the drain current of the FET is ideally controlled entirely by the gate-source voltage Vgs of the FET. Thus, the FET may be used as an element completely identical to the VCCS 131 of FIG. 4.

Figure 7:
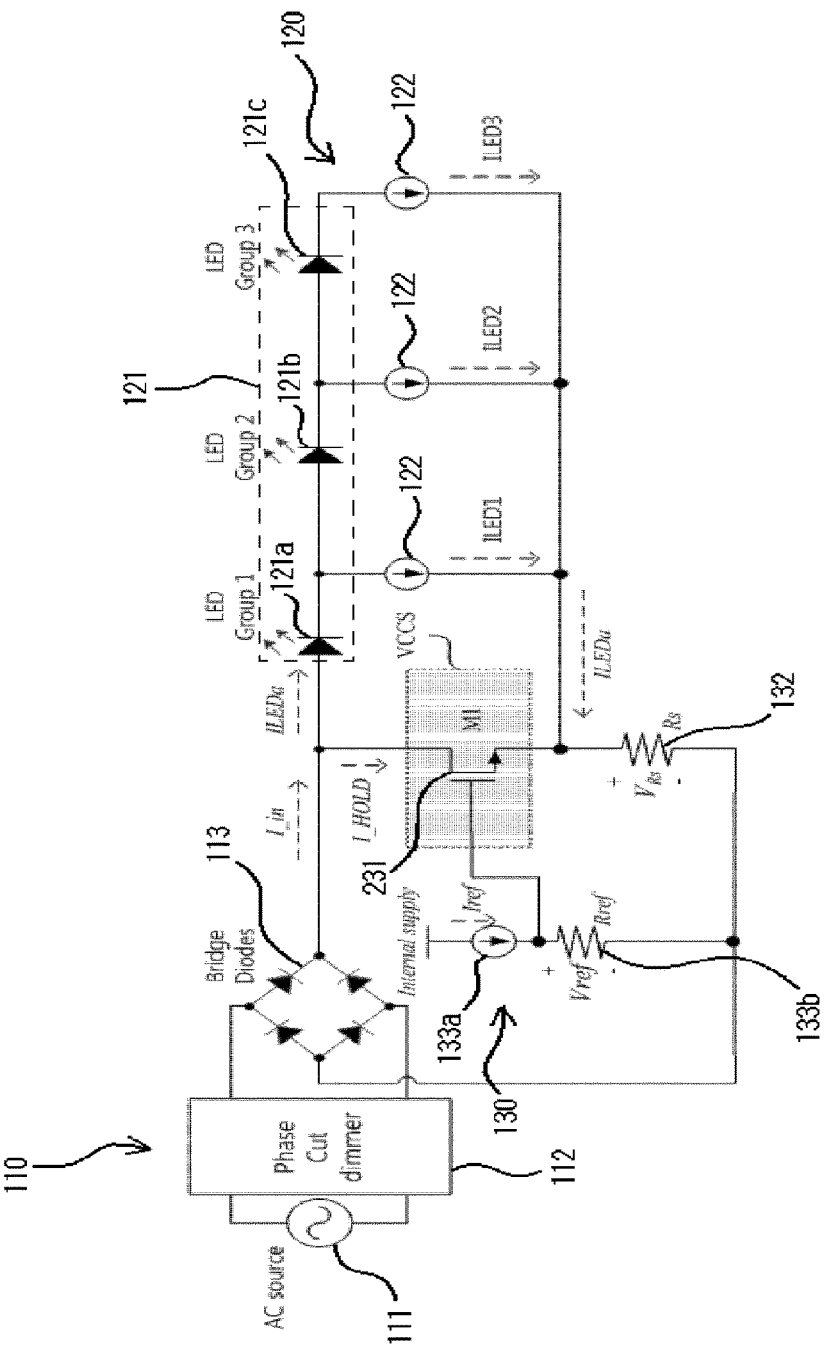
FIG. 7 is a diagram showing a specific example of a reference voltage supply unit in the AC LED driving circuit according to the embodiment of FIG. 6.

FIG. 7 is a diagram showing a specific example of the reference voltage supply unit of the AC LED driving circuit according to the embodiment of FIG. 6.

As shown in the drawing, the reference voltage supply unit of the dimmer driving unit includes a current source 133a (internal supply, Iref) and a resistor 133b Rref connected to the output terminal of the current source 133a. Here, the gate of the FET that is the VCCS 231 is connected to a connection line between the current source 133a and the resistor 133b, and the resistor 133b is connected to a connection line between the common resistor 132 and the rectification circuit 113.

Figure 8:
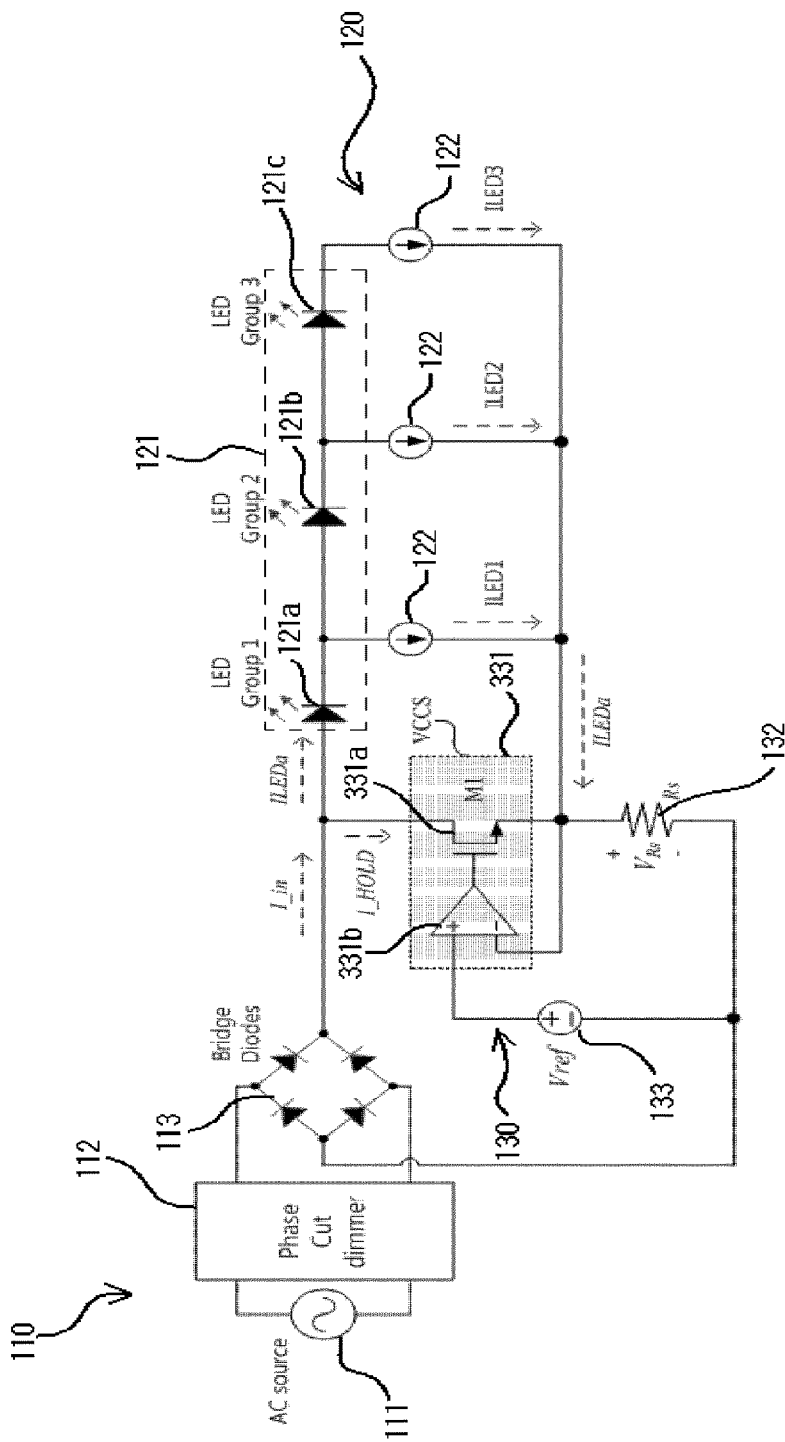
FIG. 8 is a diagram showing another specific example of the voltage-controlled current source in the AC LED driving circuit according to the embodiment of the present invention.

Referring to FIG. 8, FIG. 8 is a diagram showing another specific example of a VCCS that is a principle component of the AC LED driving circuit according to the embodiment of the present invention.

As shown in the drawing, a VCCS 331 is configured such that a comparator 331b is connected to an FET 331a. That is, the comparator 331b is disposed on a connection line between the gate of the FET 331a and the reference voltage supply unit 133, and is configured such that a positive (+) voltage is applied from the reference voltage supply unit 133 and a negative (−) voltage is applied from a parallel connection node between a connection line between the output terminal of the FET 331a and the common resistor 132 and a connection line between a third LED unit 121c and the rectification circuit 113.

In accordance with this configuration, in the AC LED driving circuit 100 described with reference to FIG. 4, the value of gm in Equation (1) can be greatly raised, and Equation (1) may be simplified to the following Equation (2):

$$I\_HOLD = \frac{(Vref - ILEDa \times Rs)}{Rs} \qquad (2)$$

Accordingly, a circuit in which the value of I_HOLD is not related to the gm characteristic of the FET 331a (M1) is implemented, thus enabling a more stable circuit to be configured.

Figure 9:
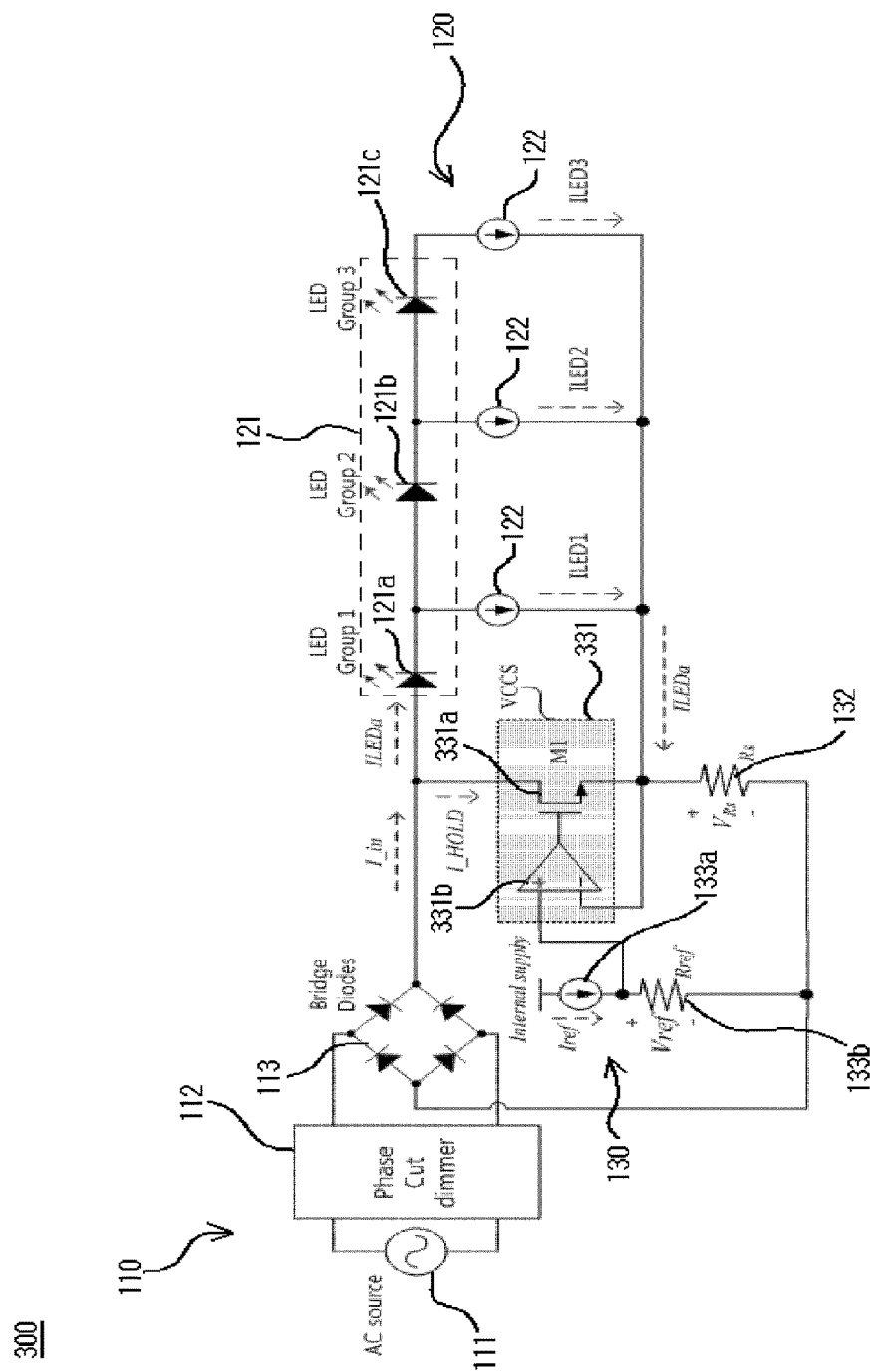
FIG. 9 is a diagram showing a specific example of a reference voltage supply unit in the AC LED driving circuit of FIG. 8.

FIG. 9 is a diagram showing a specific example of the reference voltage supply unit in the AC LED driving circuit of FIG. 8.

As shown in the drawing, the reference voltage supply unit of the dimmer driving unit includes a current source (internal supply, Iref) and a resistor Rref connected to the output terminal of the current source. Here, the voltage of the current source is input to the positive (+) input terminal of the comparator and the resistor is connected in parallel with a connection line between the common resistor and the rectification circuit.

By means of the configuration, the reference voltage Vref of the reference voltage supply unit may be simply implemented as Iref×Rref.

Figure 10:
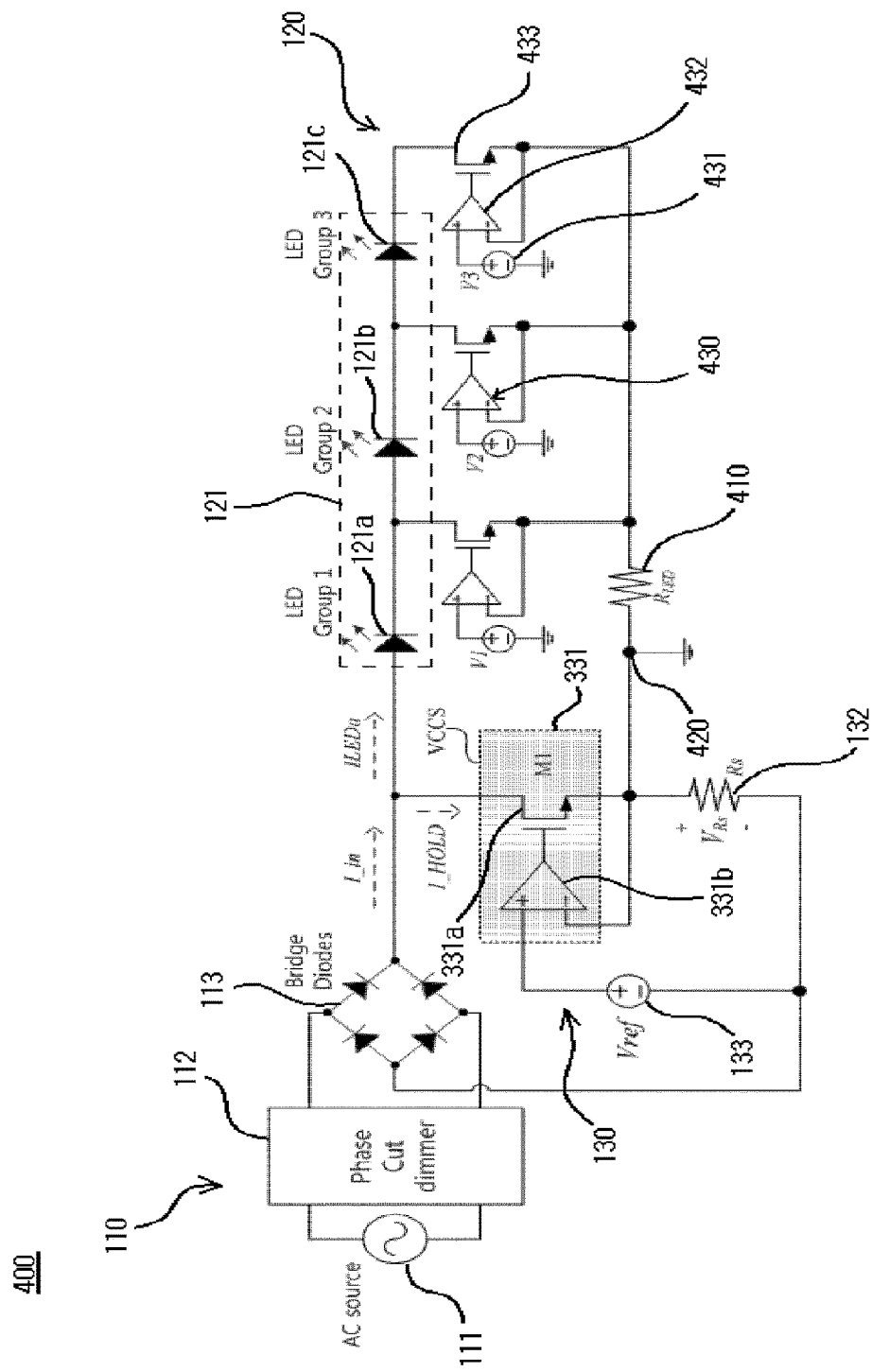
FIG. 10 is a diagram showing a specific example of an LED driving unit and a voltage-controlled current source in the AC LED driving circuit according to the embodiment of the present invention.

Referring to FIG. 10, FIG. 10 is a diagram showing a specific example of the LED driving unit in the AC LED driving circuit of FIG. 8.

As shown in the drawing, the LED driving unit further includes components corresponding to an LED common resistor 410 and a ground point 420, in addition to the existing components. That is, the LED common resistor 410 is connected in common to the output lines of respective switching circuit units 430, and the ground point 420 is grounded on a connection line between the LED common resistor 410 and the output terminal of the VCCS 331.

Further, each of the switching circuit units 430 may be configured to include a voltage supply unit 431, a comparator 432, and an FET 433.

Each voltage supply unit 431 applies a reference voltage to the corresponding switching circuit unit 430.

Each comparator 432 is configured to receive the reference voltage from the corresponding voltage supply unit 431 through the positive (+) input terminal thereof, and receive the source output voltage of the FET 433 through the negative (−) input terminal thereof.

Each FET 433 is a switching element connected to the output terminal of a corresponding one of LEDs forming the LED lighting unit 121. Such an FET 433 is connected at the drain thereof to the output terminal of the corresponding LED, at the gate thereof to the output terminal of the comparator 432, and at the source thereof to the LED common resistor 410. Further, the negative (−) input terminal of the comparator 432 is connected to a connection line between the source output terminal of the FET 433 and the LED common resistor 410, and then the source output voltage of the FET 433 is applied as the negative (−) input voltage of the comparator 432.

By means of this configuration, the ground point 420 is set to the source terminal of the FET 433 and the VCCS 331, so that channel currents through the respective switching circuit units 430 of the LED driving unit are determined by the ratio of the reference voltages V1, V2, and V3 for respective channels and the resistance of the LED common resistor ($R_{LED}$) 410. A global current flowing through the LED driving unit is applied to the common resistor Rs 132 and then forms a part of a negative feedback path composed of the VCCS 331, the common resistor Rs 132, and the reference voltage Vref of the reference voltage supply unit 133.

Figure 11:
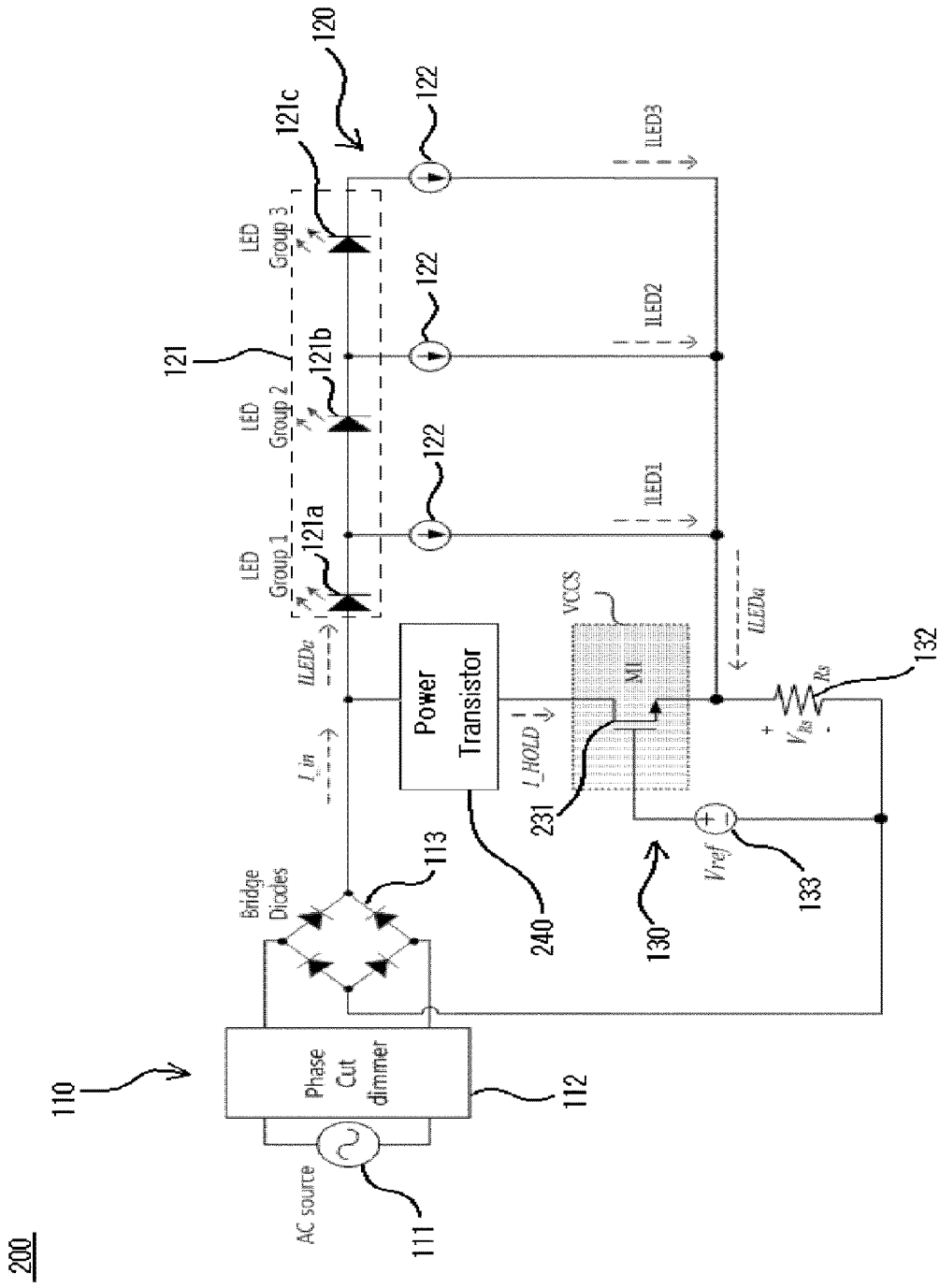
FIGS. 11 and 12 are diagrams showing other embodiments of the AC LED driving circuit according to the present invention.
Figure 12:
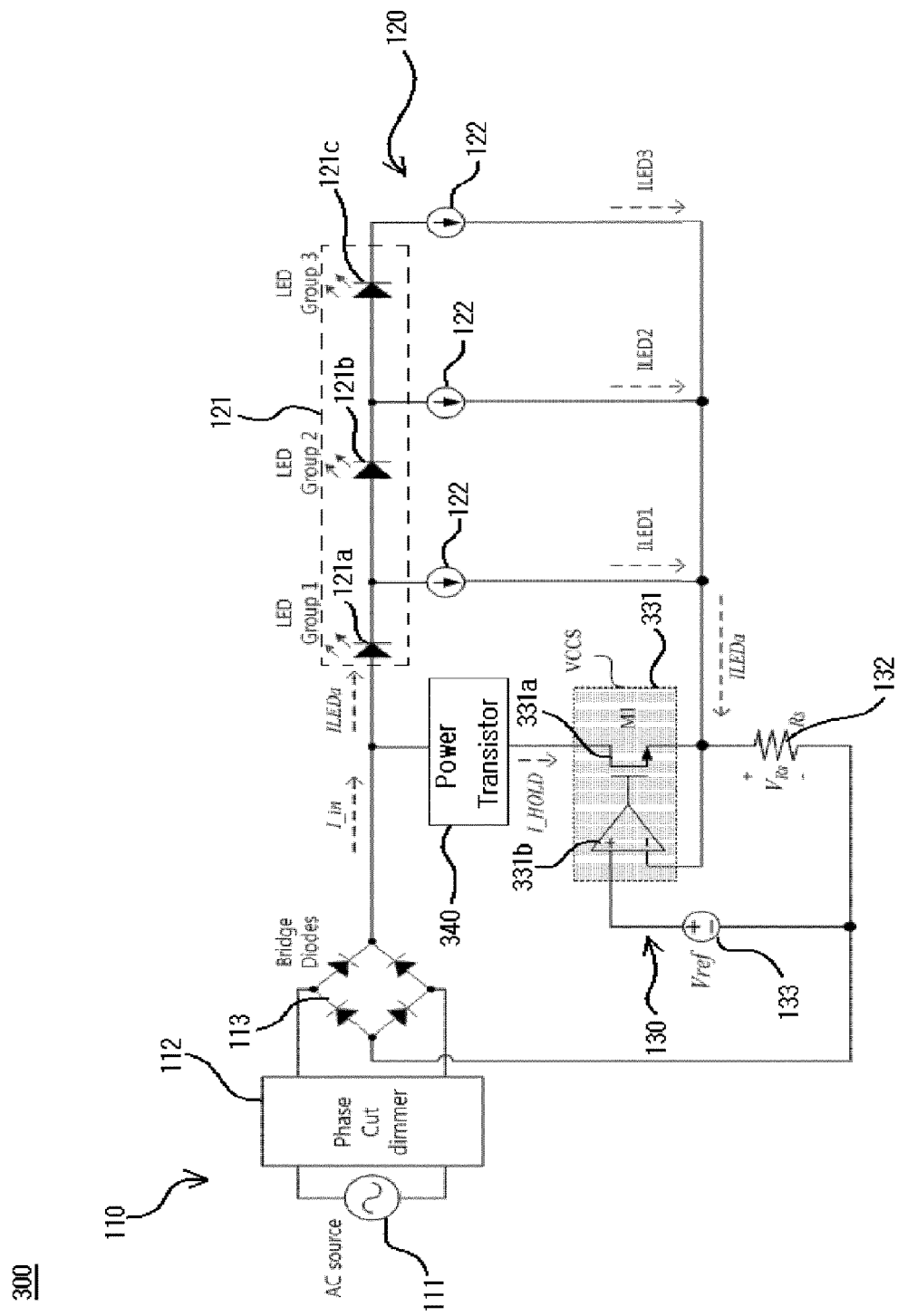

FIGS. 11 and 12 are diagrams showing other embodiments of the AC LED driving circuit according to the embodiment of the present invention.

FIG. 11 illustrates a form in which a power transistor 240 is disposed on a connection line between a connection line between the output terminal of the rectification circuit 113 and the first LED unit 121a and the input terminal of the FET 231 forming the VCCS, in the AC LED driving circuit 200 according to the embodiment of FIG. 6. Further, FIG. 12 illustrates a form in which a power transistor 340 is disposed on a connection line between a connection line between the output terminal of the rectification circuit 113 and the first LED unit 121a and the input terminal of the FET 331a included in the VCCS 331, in the AC LED driving circuit 300 according to the embodiment of FIG. 8.

Further, although, in the embodiments of FIGS. 11 and 12, the power transistors 240 and 340 have been illustrated as Ultra-High Voltage N-Type-Metal-Oxide-Semiconductor (UHV NMOS) transistors, the power transistor of the present invention is not limited to such a specific example, and any of various transistors, such as a Junction gate Field-Effect Transistor (JFET), an NMOS transistor, and a Bipolar Junction Transistor (BJT), may be used as the power transistors 240 and 340.

By means of the power transistor 240 or 340, the transistor included in the VCCS 231 or 331 may be implemented using a low voltage transistor or a high voltage transistor. This is possible because the power transistor 240 or 340 is arranged at the input terminal of the VCCS 231 or 331 and functions to clamp the input of an ultra-high voltage.

As can be seen from the descriptions made with reference to FIGS. 4 to 12, the AC LED driving circuit according to the present invention is configured such that an LED driving circuit and a dimmer driving circuit are connected in parallel with each other, based on a power supply circuit, and is configured to, when a current value supplied to the LED driving circuit is sufficient to drive LEDs and a dimmer, drive the dimmer using the corresponding supplied current value, and when the current value supplied to the LED driving circuit is not sufficient to drive the dimmer, compensate for such deficiency in the current value with the hold current value of the dimmer driving circuit, thus enabling the dimmer to be always normally operated.

Further, the present invention provides the AC LED driving circuit, in which an LED driving circuit and a dimmer driving circuit are connected in parallel with each other based on a power supply circuit, and which can always stably operate the dimmer without requiring a separate control circuit for controlling the operating time point of a first LED included in the LED driving circuit and the operating time point of the hold current of the dimmer driving circuit.

The above description is merely related to embodiments for practicing the AC LED driving circuit of the present invention, and those skilled in the art to which the present invention pertains will appreciate that the present invention is not limited to the above embodiments, and the technical spirit of the present invention will be present even in a range in which various modifications and changes are possible, without departing from the scope and spirit of the invention as disclosed in the accompanying claims.

The AC LED driving circuit according to the present invention is configured such that an LED driving circuit and a dimmer driving circuit are connected in parallel with each other, based on a power supply circuit, and is configured to, when a current value supplied to the LED driving circuit is sufficient to drive LEDs and a dimmer, drive the dimmer using the corresponding supplied current value, and when the current value supplied to the LED driving circuit is not sufficient to drive the dimmer, compensate for such deficiency in the current value with the hold current value of the dimmer driving circuit, thus enabling the dimmer to be always normally operated.

Further, the present invention provides the AC LED driving circuit, in which an LED driving circuit and a dimmer driving circuit are connected in parallel with each other based on a power supply circuit, and which can always stably operate the dimmer without requiring a separate control circuit for controlling the operating time point of a first LED included in the LED driving circuit and the operating time point of the hold current of the dimmer driving circuit.

What is claimed is:

1. An Alternating Current (AC) Light Emitting Diode (LED) driving circuit, comprising:
 a power supply unit including a dimmer connected to an AC power source and supplied with an AC voltage from the AC power source and a rectification circuit configured to rectify an output voltage of the dimmer;
 an LED driving unit including an LED lighting unit having a first LED unit located at a shortest distance from an output terminal of the rectification circuit to an n-th LED unit located at a longest distance from the output terminal of the rectification circuit, and a plurality of switching circuit units, input terminals of which are respectively connected to output terminals of a single LED unit, or two or more LED units constituting the LED lighting unit to form current supply channels for corresponding LED units;
 a dimmer driving unit including a voltage-controlled current source, an input terminal and an output terminal of which are respectively connected to a connection line between the output terminal of the rectification circuit and the first LED unit and to an output terminal of the switching circuit units, a reference voltage supply unit configured to apply a positive (+) reference voltage to the voltage-controlled current source, and a common resistor, a first end of which is connected to a negative (−) terminal of the reference voltage supply unit, and a second end of which is connected in common to an output line of the voltage-controlled current source and to an output terminal of the switching circuit units,
 wherein an output voltage of the voltage-controlled current source connected in series with the common resistor is input as a negative (−) voltage to the voltage-controlled current source, and then the current supplied from the rectification circuit to the LED driving unit is included in a negative feedback path of the dimmer driving unit.

2. The AC LED driving circuit of claim 1, wherein the voltage-controlled current source is designed such that current corresponding to the voltage applied from the reference voltage supply unit is output.

3. The AC LED driving circuit of claim 1, wherein a current supply path from the rectification circuit to the LED driving unit is connected in parallel with a line on which the voltage-controlled current source and the common resistor are connected in series with each other.

4. The AC LED driving circuit of claim 3, wherein when a reference voltage (Vref) from the reference voltage supply unit is less than a value obtained by multiplying a current (ILEDa) supplied to the LED lighting unit by resistance of the common resistor (Rs), current (I_HOLD) flowing through the voltage-controlled current source is determined by the following equation:

$$\text{I\_HOLD} = \frac{gm(Vref - ILEDa \times Rs)}{1 + gmRs}$$

where gm denotes a constant indicative of a voltage-to-current ratio.

5. The AC LED driving circuit of claim 3, wherein:
when a value obtained by multiplying a current (ILEDa) supplied to the LED lighting unit by resistance of the common resistor (Rs) is greater than a positive (+) input voltage of the voltage-controlled current source, the current (I_HOLD) flowing through the voltage-controlled current source becomes 0 due to an off operation of the voltage-controlled current source, so that the dimmer is driven by the current of the LED driving unit, and when the current (ILEDa) supplied to the LED lighting unit is 0, a negative feedback circuit for driving the dimmer is formed using only the positive (+) input voltage of the voltage-controlled current source and the common resistor, and thus the dimmer is driven by the dimmer driving unit while a condition in which current (I_in) output from the rectification circuit is identical to the current (I_HOLD) flowing through the voltage-controlled current source is satisfied.

6. The AC LED driving circuit of claim 1, wherein the voltage-controlled current source comprises a Field Effect Transistor (FET), a drain of which is connected to the connection line between the output terminal of the rectification circuit and the first LED unit, a source of which is connected to the common resistor, and a gate of which is connected to the reference voltage supply unit.

7. The AC LED driving circuit of claim 6, wherein:
the reference voltage supply unit of the dimmer driving unit comprises a current source (internal supply, Iref) and a resistor (Rref) connected in series with each other, and is configured such that the gate of the FET that is the voltage-controlled current source is connected to a connection line between the current source (Iref) and the resistor (Rref) of the reference voltage supply unit, and the resistor (Rref) of the reference voltage supply unit is connected in parallel with a connection line between the common resistor and the rectification circuit.

8. The AC LED driving circuit of claim 6, wherein the voltage-controlled current source further comprises a comparator disposed on a connection line between the gate of the FET and the reference voltage supply unit and configured to receive a positive (+) voltage from the reference voltage supply unit and receive a negative (−) voltage from a connection node between the source of the FET and the common resistor.

9. The AC LED driving circuit of claim 8, wherein the reference voltage supply unit of the dimmer driving unit comprises a current source (internal supply, Iref) and a resistor (Rref) connected in series with each other, and is configured such that a voltage value of the current source (Iref) of the reference voltage supply unit is applied to a positive (+) input terminal of the comparator and the resistor (Rref) of the reference voltage supply unit is connected in parallel with a connection line between the common resistor and the rectification circuit.

10. The AC LED driving circuit of claim 1, wherein:
the voltage-controlled current source further comprises:
an FET, a drain of which is connected to a connection line between the output terminal of the rectification circuit and the first LED unit, a source of which is connected to the common resistor, and a gate of which is connected to the reference voltage supply unit; and
a first comparator disposed on a connection line between the gate of the FET and the reference voltage supply unit, and configured to receive a positive (+) voltage from the reference voltage supply unit and receive a negative (−) voltage from a connection node between the source of the FET and the common resistor, and
the LED driving unit further comprises:
an LED common resistor connected in common to output lines of the respective switching circuit units; and
a ground point grounded on a connection line between the LED common resistor and the output terminal of the voltage-controlled current source.

11. The AC LED driving circuit of claim 10, wherein each of the switching circuit units comprises:
a switch voltage supply unit for supplying a reference voltage to a corresponding switching circuit unit;
a second comparator for receiving the reference voltage of the switching voltage supply unit through a positive (+) input terminal thereof; and
an FET, a drain of which is connected to an output terminal of a corresponding LED unit forming the LED lighting unit, a gate of which is connected to an output terminal of the second comparator, and a source of which is connected to the LED common resistor,
wherein a negative (−) input terminal of the second comparator is connected to a connection line between the source of the FET and the LED common resistor, and a source output voltage of the FET is input as a negative (−) input voltage to the second comparator.

12. The AC LED driving circuit of claim 1, wherein each of the switching circuit units comprises:
a switching voltage supply unit for applying a reference voltage to a corresponding switching circuit unit;
a comparator for receiving the reference voltage of the switching voltage supply unit through a positive (+) input terminal thereof;
an FET, a drain of which is connected to an output terminal of a corresponding LED unit forming the LED lighting unit, a gate of which is connected to an output terminal of the comparator, and a source of which is connected to a connection line between the output terminal of the voltage-controlled current source of the LED lighting unit and the common resistor,
wherein a negative (−) input terminal of the comparator is connected to a connection line between the source of the FET and the common resistor, and a source output voltage of the FET is input as a negative (−) input voltage to the comparator.

13. The AC LED driving circuit of claim 1, further comprising a power transistor disposed between a connection line between the output terminal of the rectification circuit and the first LED unit and the input terminal of the voltage-controlled current source.

* * * * *